United States Patent
McEvoy et al.

(10) Patent No.: US 10,419,376 B2
(45) Date of Patent: Sep. 17, 2019

(54) STAGGERED NOTIFICATION BY AFFINITY TO PROMOTE POSITIVE DISCUSSION

(71) Applicant: Google Inc., Mountain View, CA (US)

(72) Inventors: Kiley McEvoy, Berkeley, CA (US); Robert Saliba, San Francisco, CA (US); Roee Livne, Sunnyvale, CA (US); Sarvjeet Singh, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 247 days.

(21) Appl. No.: 15/384,082

(22) Filed: Dec. 19, 2016

(65) Prior Publication Data
US 2018/0176273 A1 Jun. 21, 2018

(51) Int. Cl.
*H04L 29/06* (2006.01)
*H04L 12/58* (2006.01)
*G06Q 50/00* (2012.01)

(52) U.S. Cl.
CPC .............. *H04L 51/12* (2013.01); *G06Q 50/00* (2013.01); *H04L 51/24* (2013.01); *H04L 51/32* (2013.01)

(58) Field of Classification Search
CPC ......... H04L 51/12; H04L 51/24; H04L 51/32; H04L 65/4084; G06Q 50/00
See application file for complete search history.

(56) References Cited

U.S. PATENT DOCUMENTS

| | | | | |
|---|---|---|---|---|
| 7,310,612 B2* | 12/2007 | McQueen, III | ........ | G06Q 30/02 705/26.61 |
| 7,433,832 B1* | 10/2008 | Bezos | ................... | G06Q 10/10 705/26.8 |
| 7,711,806 B1* | 5/2010 | Roka | ...................... | H04L 67/06 709/217 |
| 7,716,376 B1* | 5/2010 | Price | ......................... | G06F 1/12 709/248 |
| 8,345,068 B1* | 1/2013 | Goodwin | .............. | G06F 3/0485 345/173 |
| 9,641,574 B1* | 5/2017 | Lewis | .................... | H04L 65/403 |
| 9,996,587 B1* | 6/2018 | Price | ................. | G06F 16/24578 |
| 2002/0178057 A1* | 11/2002 | Bertram | ................. | G06Q 30/02 705/14.23 |
| 2007/0299976 A1* | 12/2007 | Zafar | .................. | H04L 61/1582 709/229 |
| 2009/0144272 A1* | 6/2009 | Adarsh | .................... | G06Q 30/02 |
| 2010/0042618 A1* | 2/2010 | Rinearson | ........... | G06F 16/9535 707/723 |

(Continued)

Primary Examiner — Kostas J Katsikis
(74) Attorney, Agent, or Firm — Lowenstein Sandler LLP

(57) ABSTRACT

An indication of a content item being provided to a channel of a content item sharing platform may be received. Users associated with the channel of the content item sharing platform may be identified. Classifications of feedback of the users that are based on evaluations of the feedback from the plurality of users for other content items on the content item sharing platform may be received. A first portion of the plurality of users associated with a first classification indicating a higher rating than a second portion of the plurality of users associated with a second classification indicating a lower rating may be identified. Notifications identifying the content item may be sent to the first portion of the plurality of users associated with the first classification indicating the higher rating before the second portion associated with the second classification indicating the lower rating.

17 Claims, 7 Drawing Sheets

(56) References Cited

U.S. PATENT DOCUMENTS

| | | | | |
|---|---|---|---|---|
| 2010/0159438 A1* | 6/2010 | German | G06Q 30/02 | 434/433 |
| 2011/0225293 A1* | 9/2011 | Rathod | G06Q 10/00 | 709/224 |
| 2011/0302610 A1* | 12/2011 | Karaoguz | G06Q 20/10 | 725/46 |
| 2011/0321072 A1* | 12/2011 | Patterson | H04N 21/44222 | 725/5 |
| 2013/0138746 A1* | 5/2013 | Tardelli | H04L 12/6418 | 709/206 |
| 2013/0158984 A1* | 6/2013 | Myslinski | G06F 17/28 | 704/9 |
| 2013/0204825 A1* | 8/2013 | Su | G06N 5/04 | 706/46 |
| 2013/0325948 A1* | 12/2013 | Chen | G06Q 50/01 | 709/204 |
| 2014/0108562 A1* | 4/2014 | Panzer | G06Q 10/10 | 709/206 |
| 2014/0136554 A1* | 5/2014 | Moradi | G06F 17/30029 | 707/754 |
| 2014/0244751 A1* | 8/2014 | Tseng | H04N 21/26291 | 709/204 |
| 2014/0281978 A1* | 9/2014 | Ye | G06F 3/01 | 715/716 |
| 2015/0058757 A1* | 2/2015 | Tseng | H04L 51/32 | 715/758 |
| 2015/0113547 A1* | 4/2015 | Wolf | H04N 21/4524 | 725/9 |
| 2015/0113548 A1* | 4/2015 | Stern | H04N 21/4826 | 725/9 |
| 2015/0113549 A1* | 4/2015 | Wolf | H04N 21/2385 | 725/9 |
| 2015/0113554 A1* | 4/2015 | Stern | H04N 21/252 | 725/32 |
| 2016/0092559 A1* | 3/2016 | Lind | H04L 65/4084 | 715/716 |
| 2016/0117344 A1* | 4/2016 | Kleinpeter | G06F 16/1748 | 707/692 |
| 2017/0099358 A1* | 4/2017 | Perez | G06Q 10/0639 | |
| 2017/0180290 A1* | 6/2017 | Sardela Bianchi | H04L 51/12 | |
| 2018/0060883 A1* | 3/2018 | Cheesman | G06Q 30/0201 | |
| 2018/0084380 A1* | 3/2018 | Lucas | G06Q 30/014 | |

\* cited by examiner

STAGGERED NOTIFICATION BY AFFINITY TO PROMOTE POSITIVE DISCUSSION

TECHNICAL FIELD

This disclosure relates to the field of notifications and, in particular, to providing a notification based on a classification of user feedback.

BACKGROUND

A content item sharing platform provides content items to be viewed by users. Users can provide new content items to the content item platform. When a new content item is provided, a notification can be sent to users of the content item platform. For example, the notification can identify that the new content item has been provided to the content item platform so that users can be alerted when the new content item is provided. Subsequently, the users can view the new content item after receiving the notification and may provide feedback or a new content item.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method to receive an indication of a content item being provided to a channel of a content item sharing platform, identify a plurality of users associated with the channel of the content item sharing platform, receive classifications of feedback of the plurality of users where the classifications are based on evaluations of the feedback from the plurality of users for other content items on the content item sharing platform, identify, by a processing device, a first portion of the plurality of users associated with a first classification indicating a higher rating than a second portion of the plurality of users associated with a second classification indicating a lower rating, and send notifications identifying the content item to the first portion of the plurality of users associated with the first classification indicating the higher rating before the second portion of the plurality of users associated with the second classification indicating the lower rating.

In some implementations, the method to send the notifications may further determine an amount of time that has elapsed since the notifications have been sent to the first portion of the plurality of users and send notifications to the second portion of the plurality of users after the amount of time that has elapsed satisfies a threshold amount of time.

In some implementations, the method to send the notifications may further determine an amount of feedback for the content item that has been received from the first portion of the plurality of users and send notifications to the second portion of the plurality of users after the amount of feedback that has been received from the first portion of the plurality of users satisfies a threshold amount of feedback.

In some implementations, the method may further identify the first portion of the plurality of users by determining a total number of users that have subscribed to the channel where a number of users included in the first portion of the plurality of users and a number of users included in the second portion of the plurality of users are based on the total number of users that have subscribed to the channel.

In some implementations, the method may identify the first portion of the plurality of users based on an amount of time that the plurality of users have viewed other content items provided on the channel.

In some implementations, the first portion of the plurality of users corresponds to users who have viewed the other content items provided on the channel for a larger amount of time than the second portion of the plurality of users.

In some implementations, the evaluations of feedback from the plurality of users includes responses indicating an approval or a disapproval of the feedback where the responses are received from users of the content item sharing platform.

In some implementations, a non-transitory machine-readable storage medium storing instructions which, when executed, may cause a processing device to perform operations such as receiving an indication of a content item being provided to a channel of a content item sharing platform, identifying a plurality of users that have subscribed to the channel of the content item sharing platform, receiving classifications of feedback of the plurality of users that have subscribed to the channel with the classifications being based on evaluations of the feedback from the plurality of users to other content items on the content item sharing platform, identifying, by the processing device, a first portion of the plurality of users associated with a first classification of the classifications that indicates a higher approval rating than a second portion of the plurality of users associated with a second classification of the classifications that indicates a lower approval rating, sending notifications identifying the content item to the first portion of the plurality of users associated with the first classification that indicates the higher approval rating, identifying that a condition associated with the sending of the notifications to the first portion of the plurality of users has been satisfied, and in response to identifying that the condition has been satisfied, sending notifications identifying the content item to the second portion of the plurality of users associated with the second classification that indicates the lower approval rating.

In some implementations, a system may include a memory and a processing device that is operatively coupled with the memory. The processing device may receive an indication of a content item being provided to a channel of a content item sharing platform, identify a plurality of users associated with the channel of the content item sharing platform, receive classifications of feedback of the plurality of users where the classifications are based on evaluations of the feedback from the plurality of users for other content items on the content item sharing platform, identify, by a processing device, a first portion of the plurality of users associated with a first classification indicating a higher rating than a second portion of the plurality of users associated with a second classification indicating a lower rating, and send notifications identifying the content item to the first portion of the plurality of users associated with the first classification indicating the higher rating before the second portion of the plurality of users associated with the second classification indicating the lower rating.

BRIEF DESCRIPTION OF THE DRAWINGS

The present disclosure is illustrated by way of example, and not by way of limitation, in the figures of the accompanying drawings.

DETAILED DESCRIPTION

Figure 1:
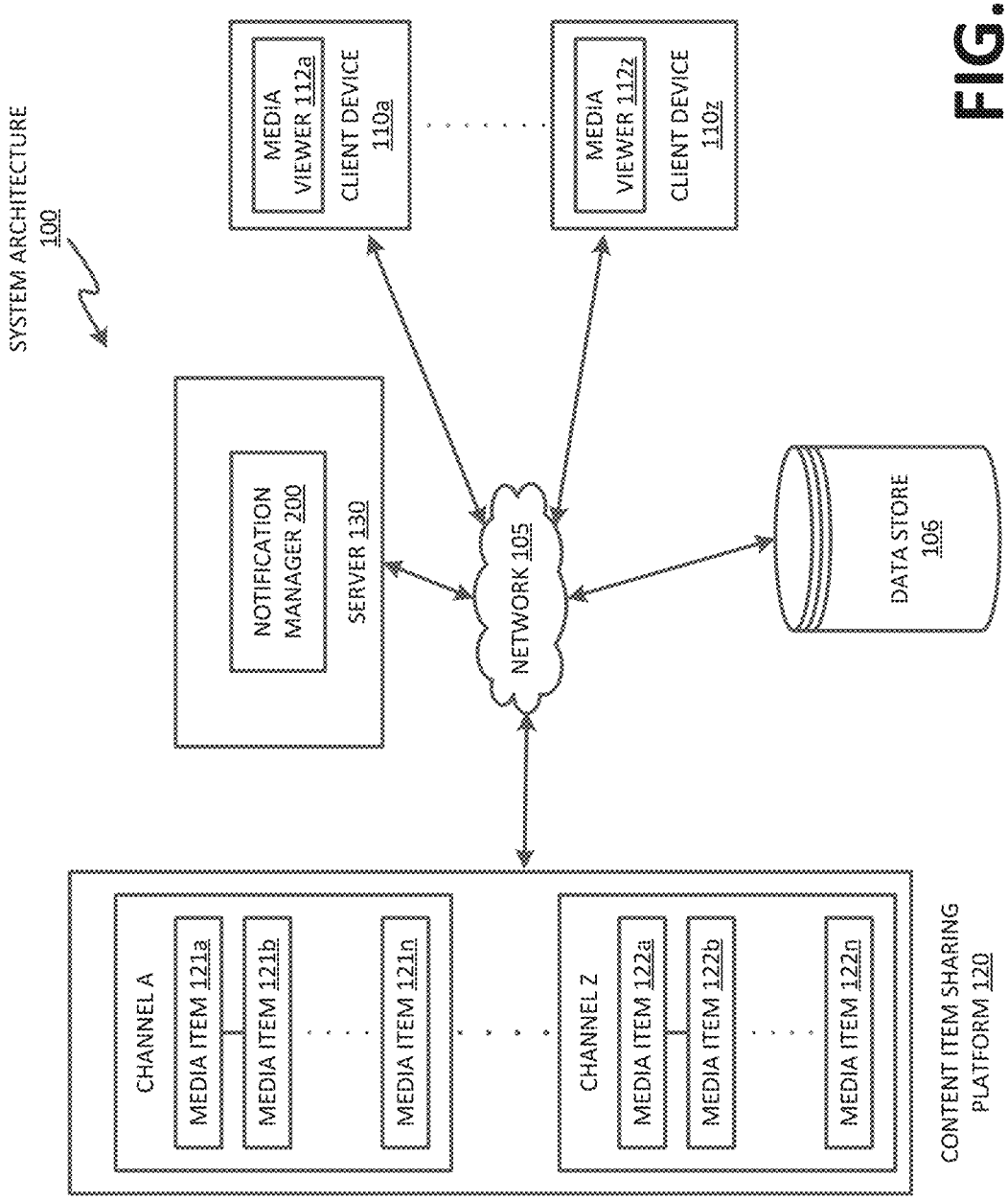
FIG. 1 illustrates an example system architecture in which implementations of the present disclosure may operate.

Aspects of the present disclosure relate to providing a notification based on a classification of user feedback. A content item sharing platform may provide multiple content items (e.g., videos) that may be accessed and viewed by users of the content item sharing platform. Furthermore, the content item sharing platform may include a subscription platform that allows users to subscribe to a channel having content items that the users enjoy viewing. For example, a channel of the content item sharing platform may include content items from a popular artist. Users of the content item sharing platform can view content items published by the artist through the channel. The channel can receive new content items from the artist which are to be published on the content item sharing platform. Users subscribed to the channel can be notified of the new content items published by the artist and can choose to view the new content items.

User feedback for content items published on the content item sharing platform provides the artist and other users of the content item sharing platform relevant insight on how the content item is received by the users. Artists may use this feedback to tailor their future content items to meet the demands of the users. Other users may use this feedback to engage in community discussion regarding the content item. An important aspect of the quality of a channel is promoting positive community discussion regarding the content items and artist of a channel.

Certain users may provide unfavorable or distracting user feedback which negatively influences community discussion. Negative community discussion may dissuade additional users from subscribing to a channel or discourage those additional users from providing positive user feedback. Therefore, fewer users would engage with the channel and the users that continue to interact with the channel may reduce the amount of time viewing content items on the channel.

Aspects of the present disclosure address the above and other deficiencies by staggering notifications to subscribers of a channel when a new content item has been published on the channel. For example, a notification that a new content item has been published may be provided to a first set of users of the content item sharing platform that have promoted positive community discussion to other content items of the content item sharing platform. Subsequently, the notification may be provided to a second set of users of the content item sharing platform which are associated with less positive community discussion, have not promoted positive community discussion, or have engaged in negative community discussion to other content items of the content item sharing platform. When the users of the content item sharing platform which have promoted positive community discussion to other content items of the content item sharing platform comment on the new content item, future community discussion will continue to be discussed in a positive manner, thereby motivating additional users to view the new content item and/or subscribe to a channel providing the new content item. Thus, providing the notification of the new content item to the first set of users before providing the notification to the second set of users may provide advantages such as, but not limited to, increasing the number of viewers of a new content item provided by a channel, increasing the number of users the channel will attract as subscribers, increasing the amount of time users engage with the channel (e.g., increase watch time of content items or increase a number of user comments to content items), and providing a greater entertainment value for users when engaging with the channel and its content items.

As an example, providing the users which have promoted positive community discussion a notification that a new content item has been published to a subscribed channel before the users which have not promoted positive community discussion or have provided negative community discussion may include sending the notification to the first set of users, waiting until a threshold number of users have provided feedback for the content item, and then sending the notification to the second set of users after the threshold number of users have provided feedback for the content item. Further, a notification may be sent to the first set of users and a notification may be sent to the second set of users after a period of time has elapsed since the notification was sent to the first set of users. User feedback may include, for example, a user comment on a content item, a user approval ("like") or disapproval ("dislike") of the content item, a user sharing of the content item with others, etc.

Users who have provided positive community discussion may be identified by evaluating feedback of the users to other content items on the content item sharing platform. For each user who provided feedback, responses from other users to the feedback can be evaluated and the user feedback can be classified according to whether the responses indicated that the feedback provided positive or negative community discussion. Responses from other users may include, for example, comments or posts related to the content item, sharing of the content item, watching of the content item or other content items of the subscribed channel, or any other action indicating a likelihood of engaging in positive community discussion with other users of the content item sharing platform.

FIG. 1 illustrates an example system architecture 100 that includes client devices 110a through 110z, a network 105, a data store 106, a content item sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110a through 110z may each include computing devices such as personal computers (PCs), laptops, mobile phones, smart phones, tablet computers, network connected televisions, netbook computers etc. In some implementations, client device 110a through 110z may also be referred to as "user devices." Each client device includes a respective media viewer 112a-z. In one implementation, the media viewers 112a-z may be applications that allow users to view content, such as images, videos (e.g., video content items), web pages, documents, etc. For example, the media viewers 112a-z may be a web browser that can access, retrieve, present, and/or navigate content (e.g., web pages such as Hyper Text Markup Language (HTML) pages, digital media items or content items, etc.) served by a web server. The media viewers 112a-z may render, display, and/or present the content (e.g., a web page, a media viewer) to a user. The media viewers 112a-z may also display an embedded media player (e.g., a Flash® player or an HTML5 player) that is embedded in a web page (e.g., a web page that may provide information about a product sold by an online merchant). In another example, the media viewers 112a-z may be a standalone application that allows users to view digital media content items (e.g., digital videos, digital images, electronic books, etc.).

The media viewers 112a-z may be provided to the client devices 110a through 110z by the server 130 and/or content item sharing platform 120. For example, the media viewers 112a-z may be embedded media players that are embedded in web pages provided by the content item sharing platform 120. In another example, the media viewers 112a-z may be applications that communicate with the server 130.

In general, functions described in one implementation as being performed by the content item sharing platform 120 can also be performed on the client devices 110a through 110z in other implementations, if appropriate. In addition, the functionality attributed to a particular component can be performed by different or multiple components operating together. The content item sharing platform 120 can also be accessed as a service provided to other systems or devices through appropriate application programming interfaces, and thus is not limited to use in websites.

In one implementation, the content item sharing platform 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items (also referred to as content items) and/or provide the media items to the user. For example, the content item sharing platform 120 may allow a user to consume, upload, search for, approve of ("like"), dislike, and/or comment on media items. The content item sharing platform 120 may also include a website (e.g., a webpage) that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the content item sharing platform 120.

The content item sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content item sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content item sharing platform 120 or other social networks may insert recommended content items into the user's syndicated feed, or may insert content items associated with a related connection of the user in the syndicated feed.

Each channel may include one or more media items 121a-n and 122a-n (i.e., content items). Examples of media items 121a-n and 122a-n can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media items 121a-n and 122a-n are also referred to as a video content item.

Media items 121a-n and 122a-n may be consumed via the Internet and/or via a mobile device application. For brevity and simplicity, an online video (also hereinafter referred to as a video content item) is used as an example of a media items 121a-n and 122a-n throughout this document. As used herein, "media," media item," "online media item," "digital media," "digital media item," "content," "content item," and "video content item" can include an electronic file that can be executed or loaded using software, firmware or hardware configured to present the digital media item to an entity. In one implementation, the content item sharing platform 120 may store the media items 121a-n and 122a-n using the data store 106.

In one implementation, the server 130 may be one or more computing devices (e.g., a rackmount server, a server computer, etc.). The server 130 may be included in the content item sharing platform 120 or be part of a different system. The server 130 may host a notification manager 200 that determines whether or not to provide a notification that a media item 121a-n or 122a-n has been published on a channel to a user. The notification manager 200 may identify a new content item that has been provided on a channel and may provide a notification to one or more users of the content item sharing platform 120 that have subscribed to the channel. Further details with regard to the notification manager 200 are disclosed in conjunction with FIG. 2. The notification may be an email, a message provided to a mobile device, a message provided in an application, or any other type of content that may notify a user.

Although implementations of the disclosure are discussed in terms of content item sharing platforms and promoting social network sharing of a content item on the content item sharing platform, implementations may also be generally applied to any type of social network providing connections between users. Implementations of the disclosure are not limited to content item sharing platforms that provide channel subscriptions to users.

In situations in which the systems discussed here collect personal information about users, or may make use of personal information, the users may be provided with an opportunity to control whether the content item sharing platform 120 collects user information (e.g., information about a user's social network, social actions or activities, profession, a user's preferences, a user's purchase transaction history, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content item sharing platform 120.

Figure 2:
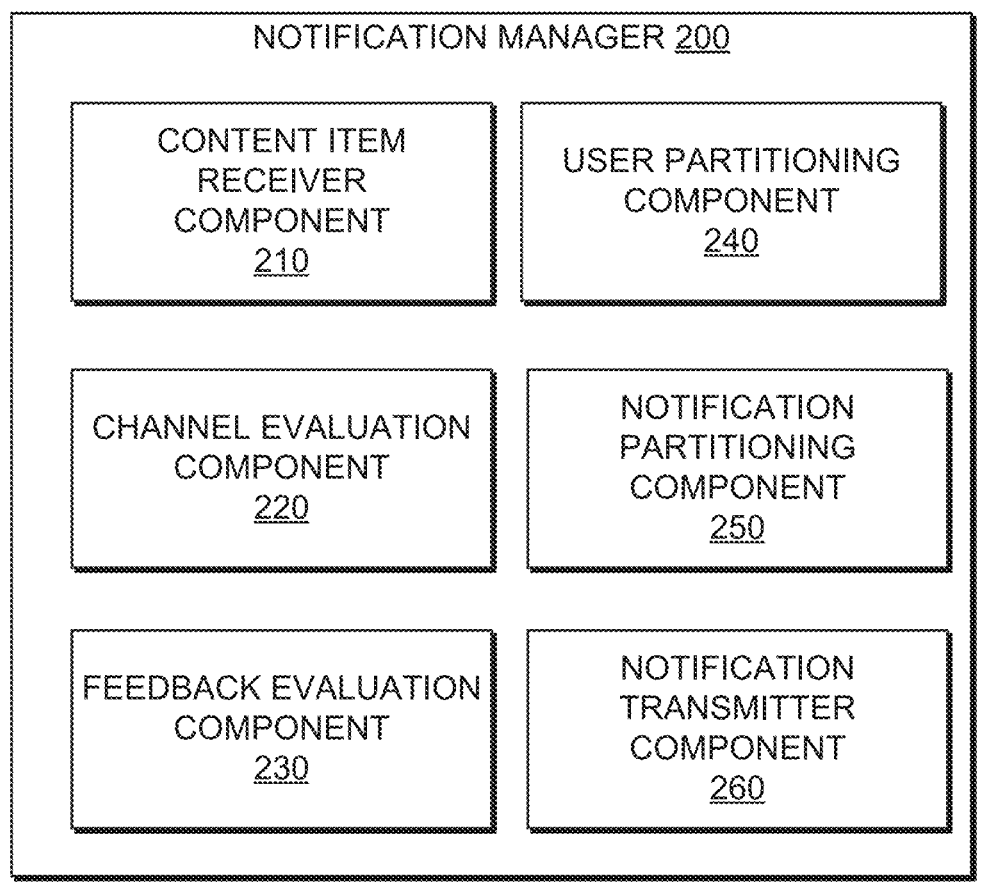
FIG. 2 illustrates an example notification manager in accordance with some implementations of the disclosure.

FIG. 2 illustrates an example notification manager 200. In general, the notification manager 200 may correspond to the notification manager 200 of a server system 130 as shown in FIG. 1. The notification manager 200 may include a video content item receiver component 210, a channel evaluation component 220, a feedback evaluation component 230, a user partitioning component 240, a notification partitioning component 250, and a notification transmitter component 260. In alternative implementations, the functionality of one or more of the components may be combined or divided.

As shown in FIG. 2, the notification manager 200 may include a video content item receiver component 210 that may store one or more video content items that may be selected to be provided to users of a content sharing platform (e.g., a new content item that has been provided to a channel). The video content item receiver component 210 may identify characteristics of the new content item, the channel associated with the new content item, and other features of the content item sharing platform 120.

The channel evaluation component 220 may determine characteristics of a channel associated with the content item received at the content item receiver component 210 (e.g., a number of subscribers to the channel, characteristics of the users subscribed to the channel, etc.). Channels can be evaluated to determine the number of users subscribed to a respective channel that are associated with different feedback classifications, the number of users associated with each feedback classification, and evaluation thresholds of each feedback classification based on the characteristics of the channel.

The feedback evaluation component 230 may identify whether a particular user has subscribed to a channel provided by the content sharing platform or has indicated an interest in receiving notifications from a channel. The feedback evaluation component 230 may further identify responses or evaluations to feedback for other content items on the content sharing platform, or receive characteristics of the user (e.g., watch time for content items of a channel, watch time for content items on any channel of the content item sharing platform, etc.). Feedback can be evaluated to determine to which group a user will be assigned at the user partitioning component 240. The user partitioning component 240 may receive characteristics associated with a channel from the channel evaluation component 220 and the characteristics identified by the feedback evaluation component 230 to allocate users to notification groups. For example, a first notification group may include users which have a positive feedback rating and more than twenty hours of watch time. Furthermore, the notification partitioning component 260 may determine whether to provide or withhold a notification to a user of the content sharing platform. For example, a notification from the video content item receiver component 210 may be selected to be provided to a user based on the user's feedback classification and transmitted to the user by the notification transmitter component 260 according to embodiments as described in further detail below.

Figure 3:
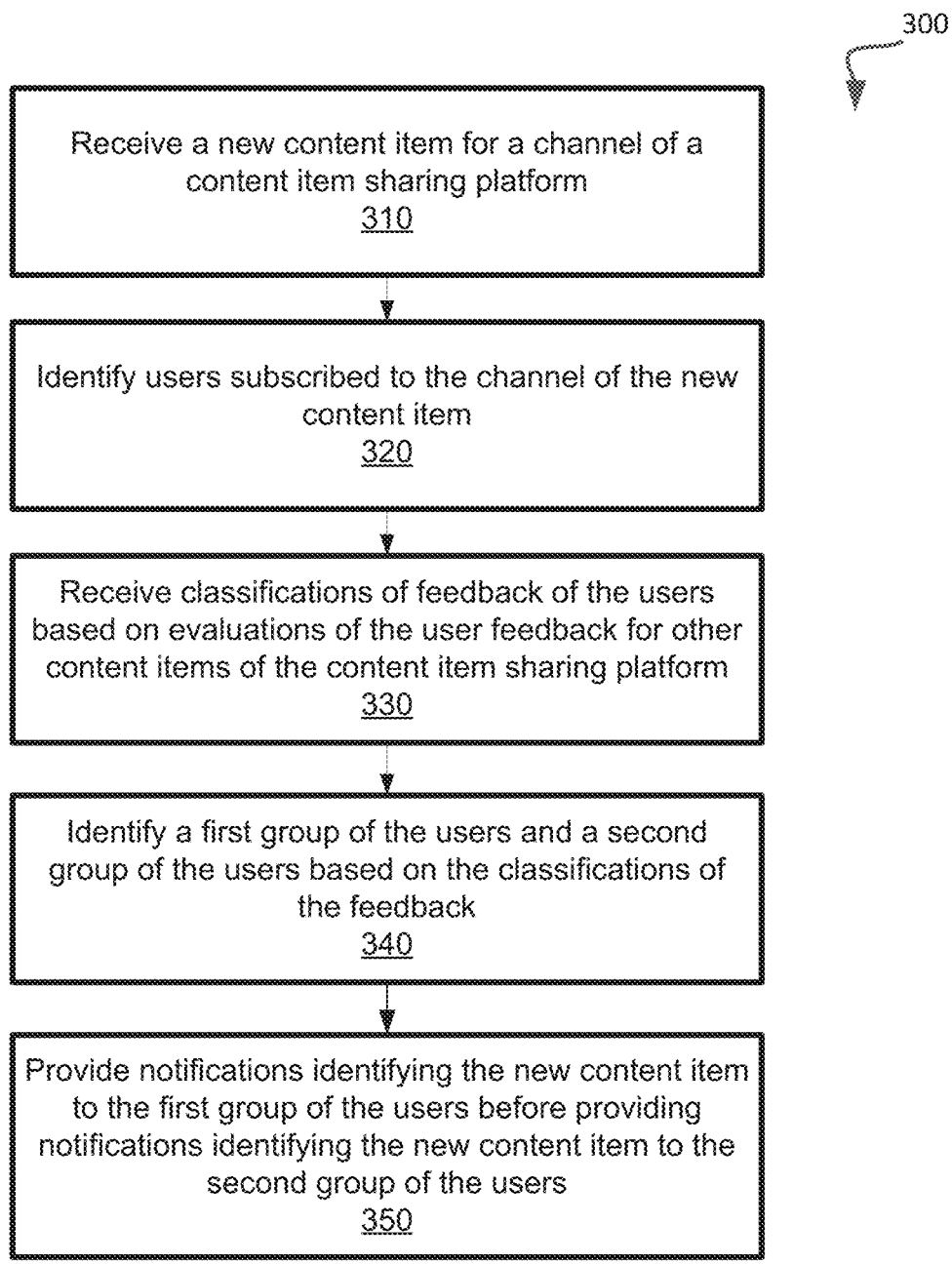
FIG. 3 is a flow diagram of an example method to provide staggered notifications to users based on user feedback.

FIG. 3 is a flow diagram of an example method 300 to provide staggered notifications to users based on user feedback. The method 300 may be performed by processing logic that may include hardware (e.g., processing device, circuitry, dedicated logic, programmable logic, microcode, etc.), software (e.g., instructions run on a processing device), or a combination thereof. In some implementations, the method 300 may be performed by the notification manager 200 of FIG. 1 or 2.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 3, the method 300 may begin with the processing logic receiving a new content item for a channel of a content item sharing platform (block 310). For example, a user of the content item sharing platform may publish a new content item to a channel on the content item sharing platform. The processing logic may further identify users who are subscribed to the channel of the new content item (block 320). For example, the content item sharing platform or a separate subscription database may be queried for users who are subscribed to the channel that has published the new content item. Subsequently, the processing logic may further receive classifications of feedback of the users based on evaluations of the user feedback for other content items of the content item sharing platform (block 330). For example, a user subscribed to the channel may comment on content items of other channels of the content item sharing platform. The comments of those content items may be evaluated to determine the effect the user comments have on the quality of discussion of the media item. For example, the evaluation of the user comments may be based on responses from other users to the user comments (e.g., whether other users have indicated a like or a dislike of the user comments, a thumbs up or a thumbs down, etc.) User feedback receiving positive evaluations (e.g., likes from other users) may be classified as promoting positive discussion. Users with such feedback may be grouped with other users who also provide feedback associated with positive discussion while users which promote positive discussion to a lesser degree, do not promote positive discussion, or even promote negative discussion may be included into a different group. Thus, a first group of users may correspond to users that have feedback classified based on a higher approval rating associated with positive discussion and a second group of users may correspond to users that have feedback classified based on a lower approval rating associated with less positive discussion.

The processing logic may further identify a first group of the users and a second group of the users based on the classifications of the feedback (block 340). For example, the first group of users may include a subset of the users with feedback in one classification, all of the users with feedback of a classification, or users with feedback across multiple classifications. The second group of users may include another subset of users with feedback in one classification, all of the users with feedback of a classification, or users with feedback across multiple classifications. The first group of users may be associated with promoting more positive discussion than the second group of users based on other metrics including, but not limited to, a total watch time of other content items in the channel, a length of time subscribed to channel, or a total length of the feedback. For example, the first group of users may have a greater channel watch time, a greater number of content items viewed, or have been subscribed to the channel or subscription service for a greater length of time than the second group of users. The processing logic may further provide notifications identifying the new content item to the first group of the users before providing notifications identifying the new content item to the second group of users (block 350). For example, the first group of users may be provided notifications and upon a threshold number of comments being posted to the content item from the first group of users (or from any users), the second group of users may then be provided notifications. Additionally, if the threshold number of comments is not satisfied, a timeout may occur after a period of time and notifications may be provided to the second group of users without the threshold number of comments posted. In some implementations, the processing logic may provide the notifications to the first and second group at a specified interval of time or at varying times. Times may be based upon characteristics of the content item, channel, or users (e.g., a popularity of the content item with users, a number of users in the channel, or a speed at which users are expected to comment). Although a first and second group are described, any number of groups may be used in the present disclosure. For example, the first group may be associated with feedback having a most positive approval rating, a second group may be associated with feedback having slightly less positive approval rating, and the third group may be associated with feedback having a lesser positive approval rating than the feedback associated with the second group. The sending of the notifications to such groups may thus begin with the group associated with feedback having the most positive approval rating and may continue sending notifications to different groups associated with feedback having successively lower approval ratings until all users (e.g., all subscribed users) have been provided a notification regarding the content item. Thus, the last notifications may be provided to users associated with feedback having the lowest approval rating and most potential for negative community discussion or negative engagement. Further details with regards to providing the notifications to the first and second groups of users are described in conjunction with FIG. 5.

For example, a new content item may be uploaded to a channel of the content item sharing platform. Users who are subscribed to the channel are identified and a feedback classification is received for each user. The feedback classification may indicate an approval rating for the feedback provided by the respective user. For example, users that have provided feedback (e.g., posted comments) on the content item sharing platform which were "liked" or "favorited" to indicate that other users viewing the feedback felt that the feedback positively contributed to the discussion surrounding the associated content item may be associated with a higher approval rating than another user that has not provided feedback, has not provided feedback which was "liked" or "favorited," or has provided feedback which negatively contributed to the discussion surrounding the associated content item. Such a user may be associated with feedback having a lower approval rating. The users may be partitioned or divided into two or more groups where a first group corresponds to users associated with feedback having higher approval ratings and a second group corresponds to users associated with feedback having lower approval ratings. Users of the first group may then be provided with a notification indicating that the new content item has been published on the channel. Users may provide feedback on the new content item and once enough feedback has been received, notifications are provided to the second group.

Figure 4:
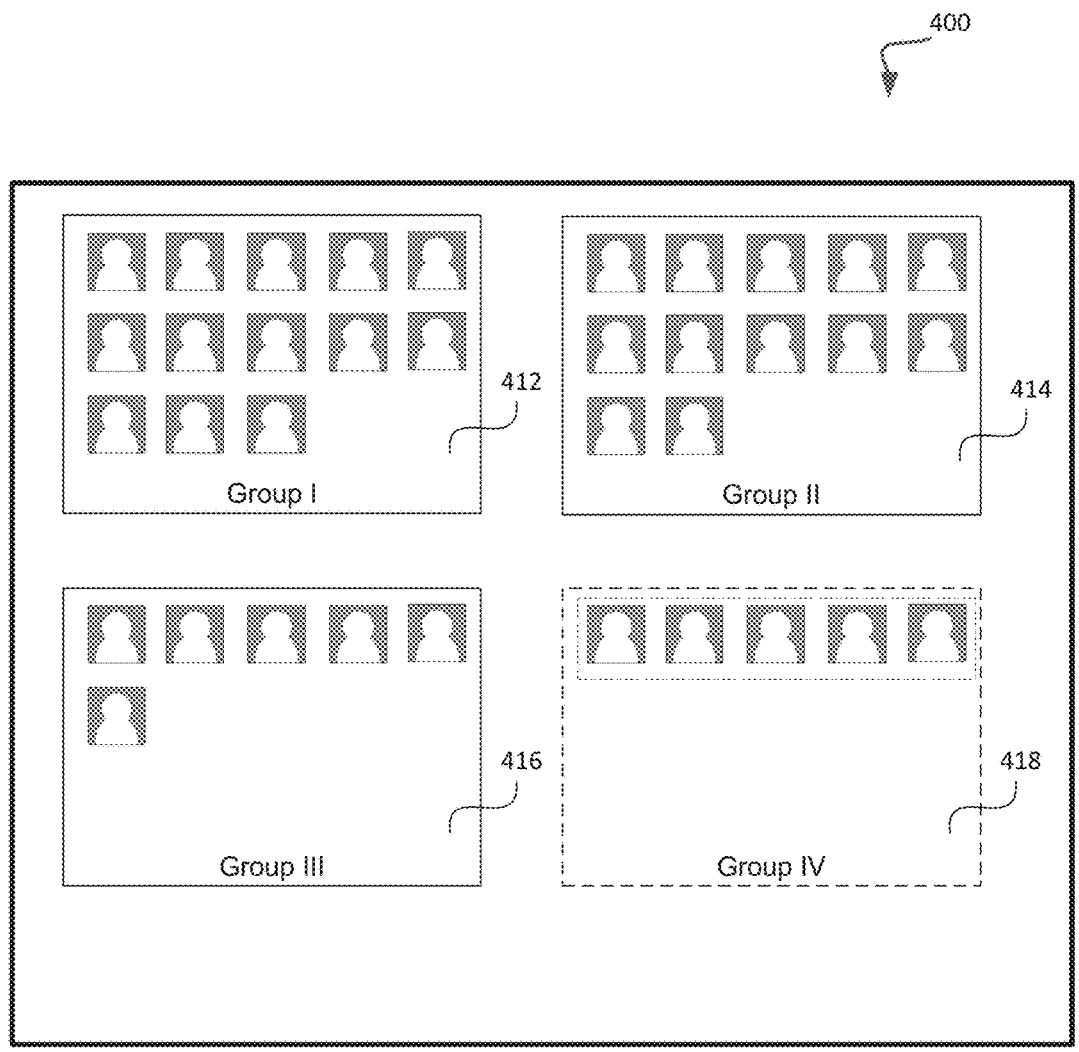
FIG. 4 illustrates an example of different user groups based on respective feedback classifications in accordance with some implementations of the present disclosure.

FIG. 4 illustrates an example graphical representation 400 representing different user groups based on respective feedback classifications. In general, the graphical representation corresponds to the classification of feedback provided by the notification manager 200 of FIGS. 1 and 2.

As shown in FIG. 4, the graphical representation 400 may provide groupings for users based on classifications of feedback. For example, a first group 412 may include users of a first feedback classification where the users have posted comments on the content item sharing platform which were "liked" or "favorited" to indicate that other users viewing the comment felt the comment positively contributed to the discussion surrounding a content item. A second group 414 may include users of a second feedback classification where the users have not posted comments on the content item sharing platform and a third group 416 may include users of a third feedback classification where the users have posted comments on the content item sharing platform which were "disliked" or reported to indicate that other users viewing the comment felt the comment negatively contributed to the discussion surrounding the associated content item. Users may be placed in a group upon indicating an interest in receiving notifications from the channel (e.g., subscribing to a channel). In an alternative embodiment, users are not placed in the first, second or third groups immediately upon joining or subscribing to the channel, but are placed in a default fourth group 418, waiting to be placed into one of the first, second, or third groups based on respective feedback. Users in the fourth group 418 may not receive notifications or may receive notifications with any one of the other groups. Users of any group may also be periodically placed into one of the other groups based on any changes to the channel evaluation or user evaluation criteria and results (e.g., based on user feedback). Further details with regards to assigning a user to a group based on characteristics of a channel and/or characteristics of a user are described in conjunction with FIG. 6.

Figure 5:
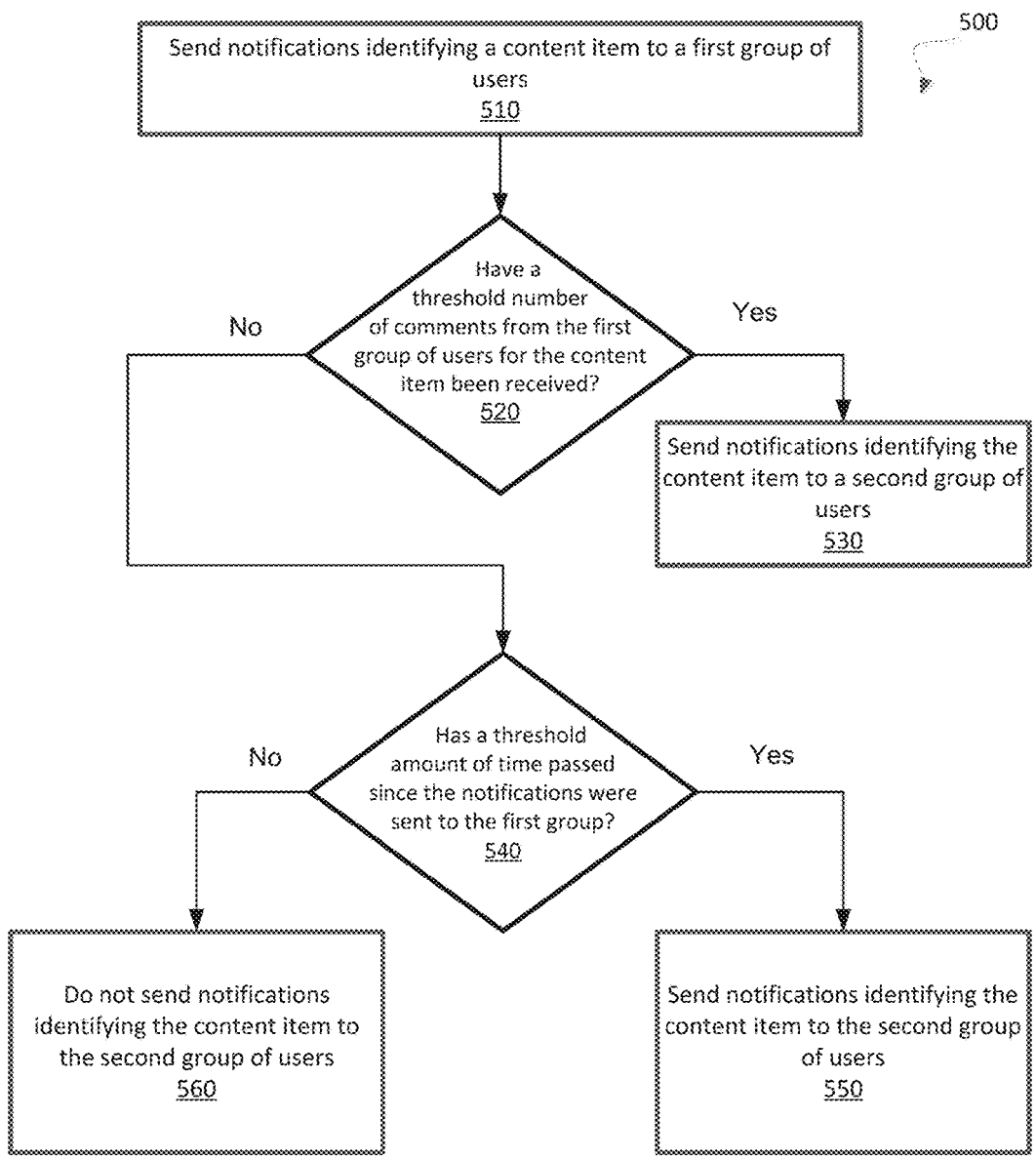
FIG. 5 is a flow diagram of an example method to determine when to send notifications to users of different groups in accordance with some implementations of the present disclosure.

FIG. 5 is a flow diagram of an example method 500 to determine when to send notifications to users of different groups. In general, the method 500 may be performed by processing logic that may include hardware (e.g., processing device, circuitry, dedicated logic, programmable logic, microcode, etc.), software (e.g., instructions run on a processing device), or a combination thereof. In some implementations, the method 500 may be performed by the notification manager 200 of FIG. 1 or 2.

As shown in FIG. 5, the method 500 may begin with the processing logic sending notifications identifying a content item to a first group of users (block 510). For example, notifications that a new content item has been published on the content item sharing platform may be provided to a first group of users with higher approval ratings than a second group of users. The notifications may identify the new content item and may include a link to the new content item on the channel of the content item sharing platform. The processing logic may further determine if a threshold number of comments from the first group of users for the content item have been received (block 520). For example, if the number of users in a group is 1,000, a threshold of 150 comments may be established. The processing logic may check to see if 150 comments have been received by the first group of users. If the threshold number of comments has been received, the processing logic may further send notifications identifying the content item to a second group of users (block 530). For example, the notification identifying the content item may be provided to a second group of users that are associated with a lower approval rating than the first group of users. If the threshold number of comments has not been received, the processing logic may further determine if a threshold amount of time passed since the notifications were sent to the first group (block 540). If the threshold amount of time has elapsed, then the processing logic may further send notifications identifying the content item to a second group of users (block 550). For example, the second group of users may be provided notifications identifying the same content item that is also identified in the notifications provided to the first group of users. Otherwise, if the threshold amount of time has not elapsed, then the processing logic may further decide not to send notifications identifying the content item to the second group of users (block 560). For example, the notifications may not be provided to the second group of users until the threshold amount of time has elapsed or the threshold number of comments has been received. Thus, the notifications may not be provided to the second group of users until a condition associated with the first group of users that have been provided notifications has been satisfied. For example, a first condition may correspond to the threshold amount of time having been elapsed and a second condition may correspond to the threshold number of comments being received.

Figure 6:
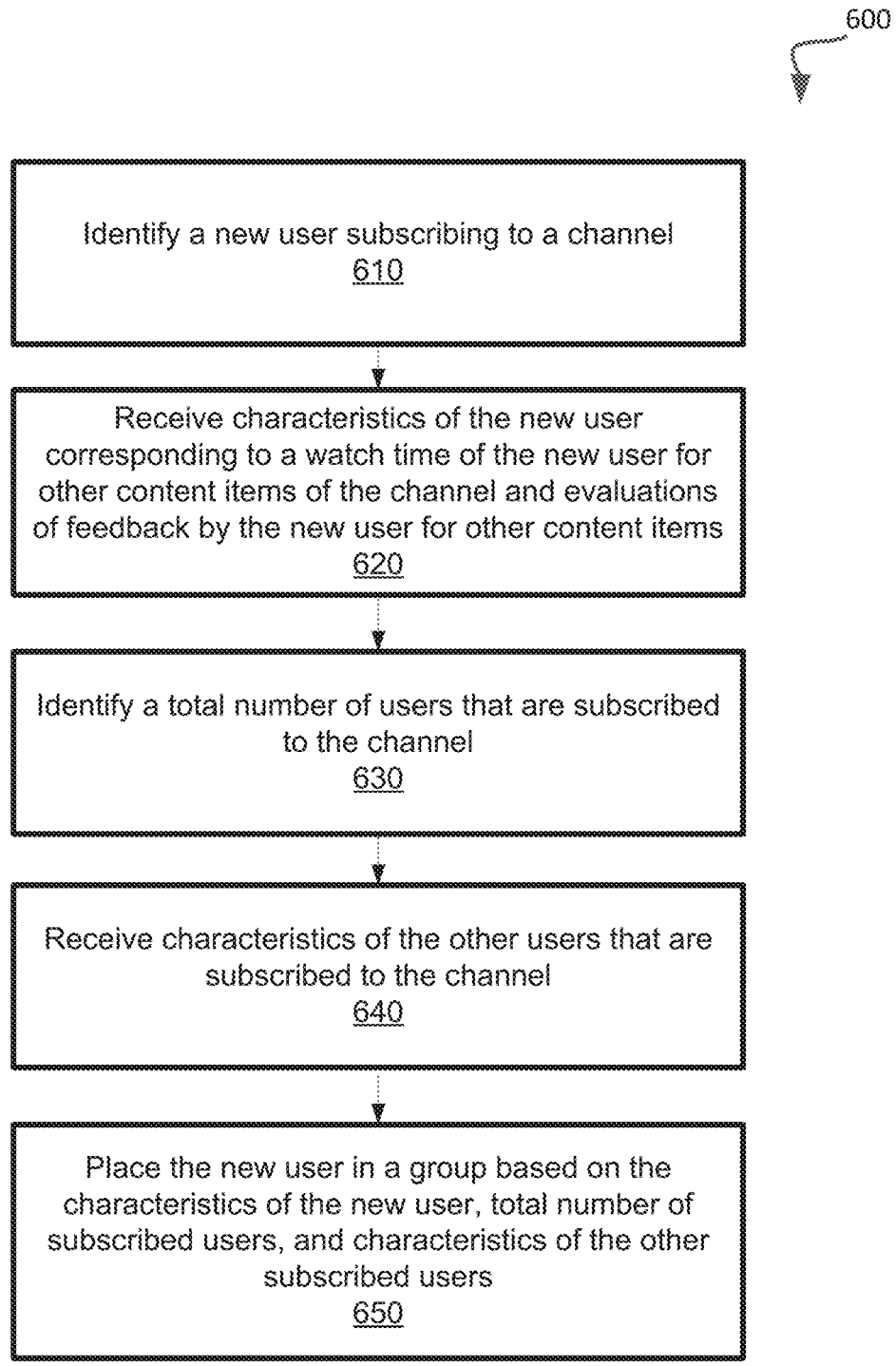
FIG. 6 is a flow diagram of an example method to group users based on feedback classifications in accordance with some implementations of the present disclosure.

FIG. 6 is a flow diagram of an example method to group users based on feedback classifications. In general, the method 600 may be performed by processing logic that may include hardware (e.g., processing device, circuitry, dedicated logic, programmable logic, microcode, etc.), software (e.g., instructions run on a processing device), or a combination thereof. In some implementations, the method 600 may be performed by the notification manager 200 of FIG. 1 or 2.

As shown in FIG. 6, the method 600 may begin with the processing logic identifying a new user subscribing to a channel (block 610). For example, a user may subscribe to the channel or perform another action to associate the user with the channel to receive notifications. The processing logic may further receive characteristics of the new user corresponding to a watch time of the new user for other content items of the channel and evaluations of feedback by the new user to other content items (block 620). The evaluations of the user feedback may correspond to an approval rating based on feedback of other users to the comments provided by the new user as previously described. Furthermore, the watch time of the new user may be based on amount of time that the new user has viewed other content items provided on the channel. The characteristics and evaluations may be considered independently or together. The processing logic may identify a total number of users that are subscribed to the channel (block 630). The processing logic may further receive characteristics of the other users that are subscribed to the channel (block 640). For example, characteristics of the other users may be characteristics corresponding to watch times for the other users and evaluations of feedback that were provided by the other users. The processing logic may place the new user in a group based on the characteristics of the new user, total number of subscribed users, and characteristics of the other subscribed users (block 650). For example, a number of users associated with a group may be based on the total number of subscribed users. In some embodiments, a channel with more subscribed users may be associated with groups with more users than a channel with fewer subscribed users. Furthermore, the new user may be assigned to one of the groups based on characteristics of the other subscribed users. For example, a channel may be associated with a first group for users with feedback having higher approval ratings and a second group for users with feedback having lower approval ratings. If the new user is associated with feedback having a higher approval rating relative to the feedback of other subscribed users, then the new user may be assigned to the first group of users. Otherwise, if the new user is associated with feedback having a lower approval rating relative to the feedback of other subscribed users, then the new user may be assigned to the second group of users. Thus, a total number of users assigned to each group may be based on the total number of subscribed users and the new user may be assigned to one of the groups based on characteristics of the new user and characteristics of the other subscribed users.

Figure 7:
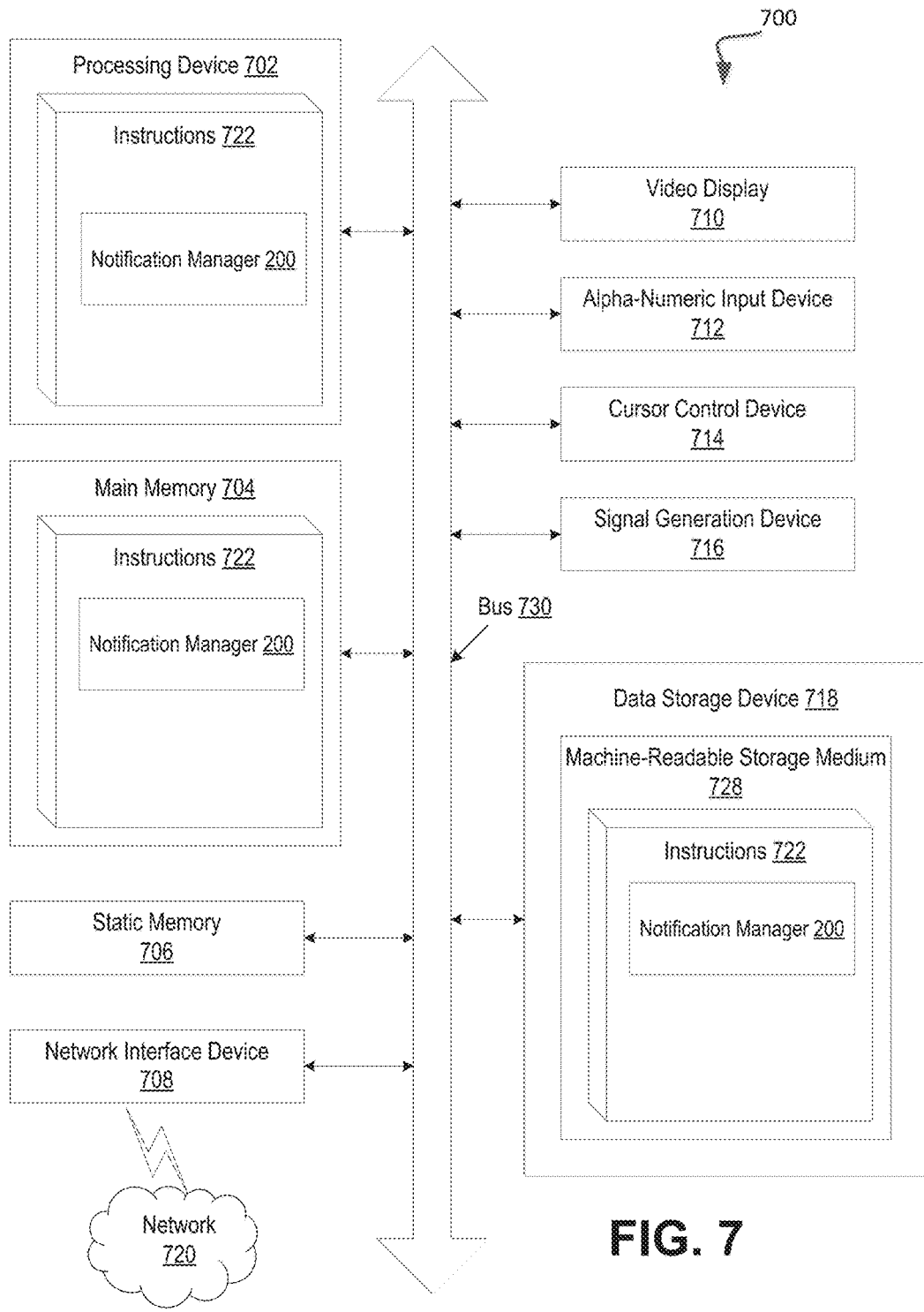
FIG. 7 illustrates a block diagram of an implementation of a computer system in which some implementations of the disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed)

network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or DRAM, etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 (also known as a computer-readable medium) on which is stored one or more sets of instructions or software 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-readable storage media.

In one implementation, the instructions 722 include instructions for a notification manager (e.g., notification manager 200 of FIG. 1 or 2) and/or a software library containing methods that functionality in a notification manager. While the machine-readable storage medium 728 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "providing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving an indication of a content item being provided to a channel of a content item sharing platform;
   identifying a plurality of users associated with the channel of the content item sharing platform;
   receiving classifications of feedback of the plurality of users, the classifications being based on evaluations of the feedback from the plurality of users for other content items on the content item sharing platform;
   identifying, by a processing device, a first portion of the plurality of users associated with a first classification indicating a higher rating than a second portion of the plurality of users associated with a second classification indicating a lower rating;
   sending notifications identifying the content item to the first portion of the plurality of users associated with the first classification indicating the higher rating;
   determining an amount of feedback for the content item that has been received from the first portion of the plurality of users to whom the notifications have been sent; and
   sending notifications identifying the content item to the second portion of the plurality of users associated with the second classification indicating the lower rating at a time that is based on the determined amount of feedback for the content item that has been received from the first portion of the plurality of users to whom the notifications have been sent.

2. The method of claim 1, wherein the sending of the notifications to the second portion of the plurality of users comprises:
   determining an amount of time that has elapsed since the notifications have been sent to the first portion of the plurality of users; and
   sending notifications to the second portion of the plurality of users after the amount of time that has elapsed satisfies a threshold amount of time.

3. The method of claim 1, wherein the evaluations of the feedback from the plurality of users comprises responses indicating an approval or a disapproval of the feedback, the responses being received from users of the content item sharing platform.

4. The method of claim 1, wherein identifying the first portion of the plurality of users comprises:
   determining a total number of users that have subscribed to the channel, wherein a number of users included in the first portion of the plurality of users and a number of users included in the second portion of the plurality of users are based on the total number of users that have subscribed to the channel.

5. The method of claim 1, wherein the identifying of the first portion of the plurality of users is based on an amount of time that the plurality of users have viewed other content items provided on the channel.

6. The method of claim 5, wherein the first portion of the plurality of users corresponds to users who have viewed the other content items provided on the channel for a larger amount of time than the second portion of the plurality of users.

7. A non-transitory machine-readable storage medium storing instructions which, when executed, cause a processing device to perform operations comprising:
   receiving an indication of a content item being provided to a channel of a content item sharing platform;
   identifying a plurality of users that have subscribed to the channel of the content item sharing platform;
   receiving classifications of feedback of the plurality of users that have subscribed to the channel, the classifications being based on evaluations of the feedback from the plurality of users to other content items on the content item sharing platform;
   identifying, by the processing device, a first portion of the plurality of users associated with a first classification of the classifications that indicates a higher approval rating than a second portion of the plurality of users associated with a second classification of the classifications that indicates a lower approval rating;
   sending notifications identifying the content item to the first portion of the plurality of users associated with the first classification that indicates the higher approval rating;
   determining an amount of feedback for the content item that has been received from the first portion of the plurality of users to whom the notifications have been sent; and
   sending notifications identifying the content item to the second portion of the plurality of users associated with the second classification that indicates the lower approval rating at a time that is based on the determined amount of feedback for the content item that has been received from the first portion of the plurality of users to whom the notifications have been sent.

8. The non-transitory machine-readable storage medium of claim 7, wherein the evaluations of the feedback from the plurality of users comprises responses indicating an approval or a disapproval of the feedback, the responses being received from users of the content item sharing platform.

9. The non-transitory machine-readable storage medium of claim 7, wherein to send the notifications to the second portion of the plurality of users, the operations further comprise:
   determining an amount of time that has elapsed since the notifications have been sent to the first portion of the plurality of users; and
   sending notifications to the second portion of the plurality of users after the amount of time that has elapsed satisfies a threshold amount of time.

10. The non-transitory machine-readable storage medium of claim 7, wherein to identify the first portion of the plurality of users, the operations further comprise:
   determining a total number of users that have subscribed to the channel, wherein a number of users included in the first portion of the plurality of users and a number of users included in the second portion of the plurality of users are based on the total number of users that have subscribed to the channel.

11. The non-transitory machine-readable storage medium of claim 7, wherein the identifying of the first portion of the plurality of users is based on an amount of time that the plurality of users have viewed other content items provided on the channel.

12. The non-transitory machine-readable storage medium of claim 11, wherein the first portion of the plurality of users corresponds to users who have viewed the other content items provided on the channel for a larger amount of time than the second portion of the plurality of users.

13. A system comprising:
a memory; and
a processing device, operatively coupled with the memory, to:
receive an indication of a content item being provided to a channel of a content item sharing platform;
identify a plurality of users associated with the channel of the content item sharing platform;
receive classifications of feedback of the plurality of users, the classifications being based on evaluations of the feedback from the plurality of users for other content items on the content item sharing platform;
identify a first portion of the plurality of users associated with a first classification indicating a higher rating than a second portion of the plurality of users associated with a second classification indicating a lower rating;
send notifications identifying the content item to the first portion of the plurality of users associated with the first classification indicating the higher rating;
determine an amount of feedback for the content item that has been received from the first portion of the plurality of users to whom the notifications have been sent; and
send notifications identifying the content item to the second portion of the plurality of users associated with the second classification indicating the lower rating at a time that is based on the determined amount of feedback for the content item that has been received from the first portion of the plurality of users to whom the notifications have been sent.

14. The system of claim 13, wherein the identifying of the first portion of the plurality of users is based on an amount of time that the plurality of users have viewed other content items provided on the channel.

15. The system of claim 14, wherein the first portion of the plurality of users corresponds to users who have viewed the other content items provided on the channel for a larger amount of time than the second portion of the plurality of users.

16. The system of claim 13, wherein to send the notifications to the second portion of the plurality of users, the processing device is further to:
determine an amount of time that has elapsed since the notifications have been sent to the first portion of the plurality of users; and
send notifications to the second portion of the plurality of users after the amount of time that has elapsed satisfies a threshold amount of time.

17. The system of claim 13, wherein to identify the first portion of the plurality of users, the processing device is further to:
determine a total number of users that have subscribed to the channel, wherein a number of users included in the first portion of the plurality of users and a number of users included in the second portion of the plurality of users are based on the total number of users that have subscribed to the channel.

* * * * *